United States Patent
Yamamoto et al.

(10) Patent No.: US 9,684,344 B2
(45) Date of Patent: Jun. 20, 2017

(54) EXTERIOR CASE AND ELECTRONIC DEVICE

(71) Applicant: FUJITSU LIMITED, Kawasaki-shi, Kanagawa (JP)

(72) Inventors: Yasufumi Yamamoto, Kawasaki (JP); Masuo Ohnishi, Hachioji (JP); Takashi Abe, Kawasaki (JP); Sonomasa Kobayashi, Kawasaki (JP)

(73) Assignee: FUJITSU LIMITED, Kawasaki-shi (JP)

( * ) Notice: Subject to any disclaimer, the term of this patent is extended or adjusted under 35 U.S.C. 154(b) by 0 days.

(21) Appl. No.: 14/340,099

(22) Filed: Jul. 24, 2014

(65) Prior Publication Data

US 2015/0061479 A1   Mar. 5, 2015

(30) Foreign Application Priority Data

Aug. 28, 2013  (JP) ................................ 2013-176492

(51) Int. Cl.
*G06F 1/16* (2006.01)

(52) U.S. Cl.
CPC ............ *G06F 1/1681* (2013.01); *G06F 1/162* (2013.01)

(58) Field of Classification Search
CPC ............................... G06F 1/1681; G06F 1/162
USPC .......... 361/679.01, 679.06, 679.09, 680–682
See application file for complete search history.

(56) References Cited

U.S. PATENT DOCUMENTS

| 6,091,601 A * | 7/2000 | Schlesener ............ G06F 1/1616 361/679.28 |
| 6,276,655 B1 * | 8/2001 | Byoun ................... F16M 11/10 361/679.27 |
| 6,747,713 B1 * | 6/2004 | Sato .................. G02F 1/133308 349/58 |
| 2011/0157794 A1 | 6/2011 | Hamada |
| 2013/0082580 A1 * | 4/2013 | Ohishi ................. G06F 1/1637 312/7.2 |

FOREIGN PATENT DOCUMENTS

| JP | 2004-007262 A | 1/2004 |
| JP | 2009-159416 A | 7/2009 |
| JP | 2010-263282 A | 11/2010 |
| JP | 2011-134188 A | 7/2011 |

OTHER PUBLICATIONS

Notification of Reasons for Refusal issued in the corresponding Japanese application No. 2013-176492 dated Mar. 1, 2017 (w/machine translation).

* cited by examiner

*Primary Examiner* — Tuan T Dinh
*Assistant Examiner* — Rockshana Chowdhury
(74) *Attorney, Agent, or Firm* — Westerman, Hattori, Daniels & Adrian, LLP

(57) ABSTRACT

An exterior case includes a first member to which a hinge bracket is attached, a fastener portion being a portion of the first member surrounding a hole in the first member, and being thickened in a thickness direction of the first member, a second member that is fixed to the first member and surrounds the fastener portion of the first member, and at least one fastener screw screwed into the hole to fasten the first member and the second member together and to fasten the hinge bracket to the first member.

15 Claims, 15 Drawing Sheets

FIG. 15

|  | THICKNESS | WEIGHT | STRENGTH | SELECTIVE COATING | COST |
|---|---|---|---|---|---|
| COMPARATIVE EXAMPLE 1 (RESIN) | C | C | C | A | A |
| COMPARATIVE EXAMPLE 2 (INTEGRATED METAL) | A | A | B | C | A |
| COMPARATIVE EXAMPLE 3 (METAL + RESIN) | A | A | C | A | B |
| COMPARATIVE EXAMPLE 4 (SHAVED METAL) | A | A | A | C | C |
| EMBODIMENT | A | A | A | A | A |

EXTERIOR CASE AND ELECTRONIC DEVICE

CROSS-REFERENCE TO RELATED APPLICATION

This application is based upon and claims the benefit of priority from the prior Japanese Patent Application No. 2013-176492 filed on Aug. 28, 2013, the entire contents of which are incorporated herein by reference.

FIELD

A technique disclosed herein is related to an exterior case and an electronic device.

BACKGROUND

There is a reinforcement structure in which a reinforcement plate or a reinforcement member is placed at a hinge fixing portion of a hinge by which two connection members are rotatably connected to each other. Such a technique is described in, for example, Japanese Laid-open Patent Publication Nos. 2004-7262 and 2009-159416.

SUMMARY

According to an aspect of the invention, an exterior case includes a first member to which a hinge bracket is attached, a fastener portion being a portion of the first member surrounding a hole in the first member, and being thickened in a thickness direction of the first member, a second member that is fixed to the first member and surrounds the fastener portion of the first member, and at least one fastener screw screwed into the hole to fasten the first member and the second member together and to fasten the hinge bracket to the first member.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 15 is a table depicting materials and structures employable for a casing of a display device 16 of the first embodiment and evaluations in terms of thickness, weight, strength, selective coating, and cost.

DESCRIPTION OF EMBODIMENT

The hinge fixing portion may receive a force varying in size or direction according to the rotation of the connected members. Thus, improvement in the strength of the hinge fixing portion is desired.

Embodiments of the present disclosure provide the fixing portion that is improved the strength of the hinge fixing portion.

A first embodiment is described in detail based on the drawings.

Figure 1:
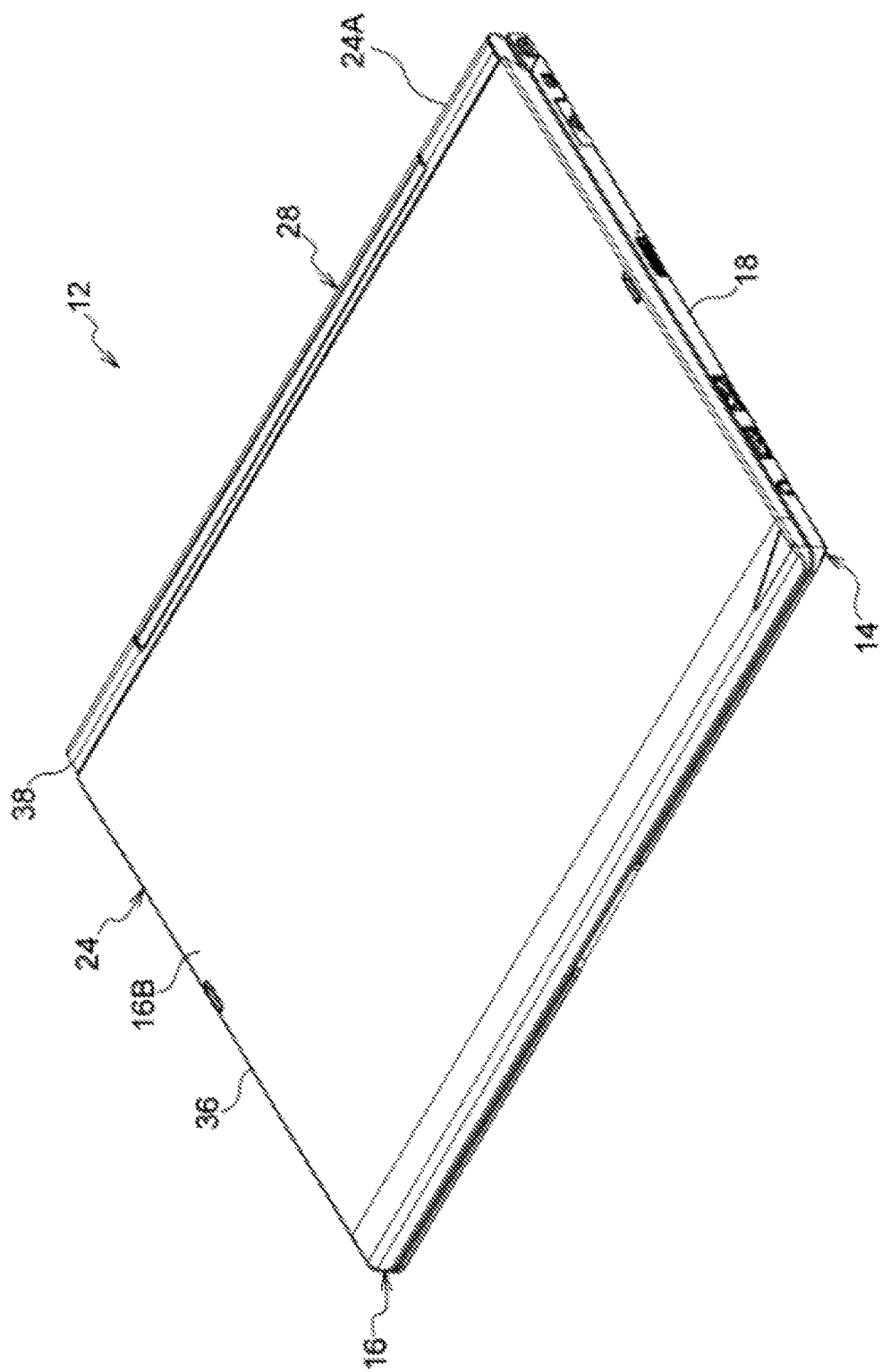
FIG. 1 is a perspective view of an electronic device of a first embodiment.
Figure 2:
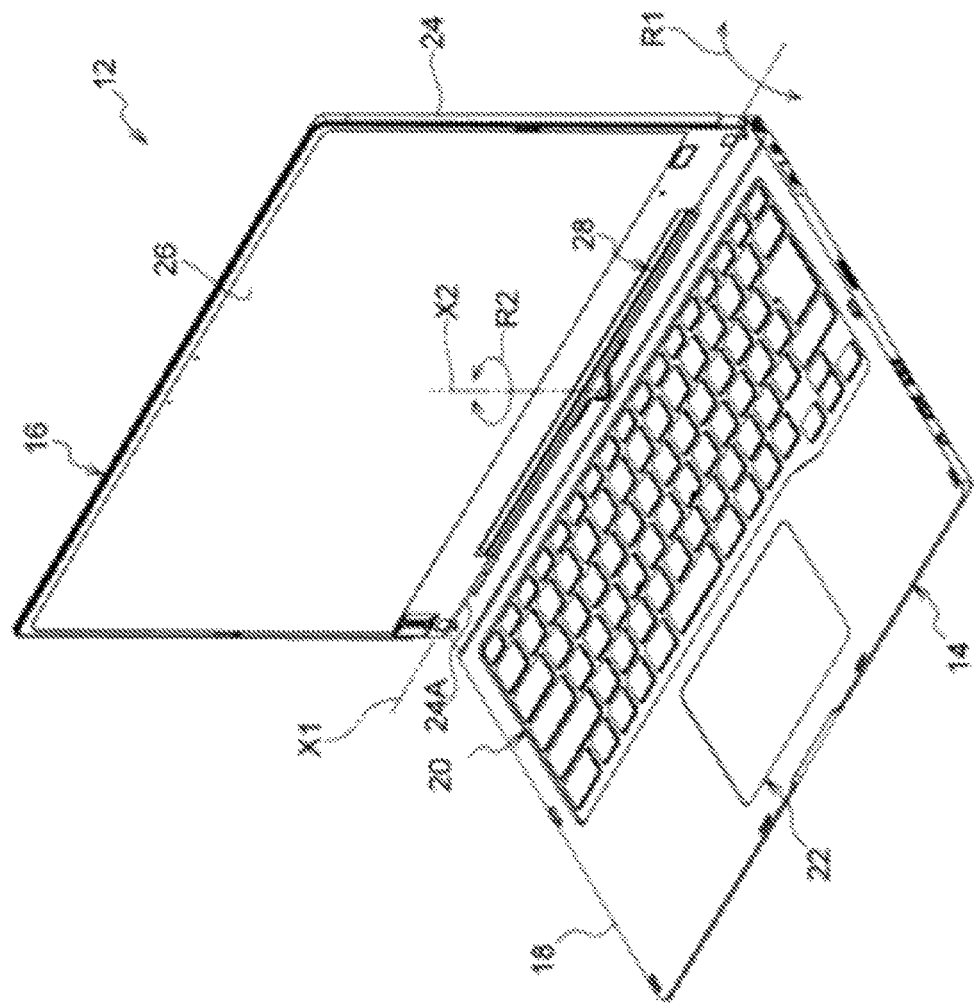
FIG. 2 is a perspective view of the electronic device of the first embodiment.
Figure 3:
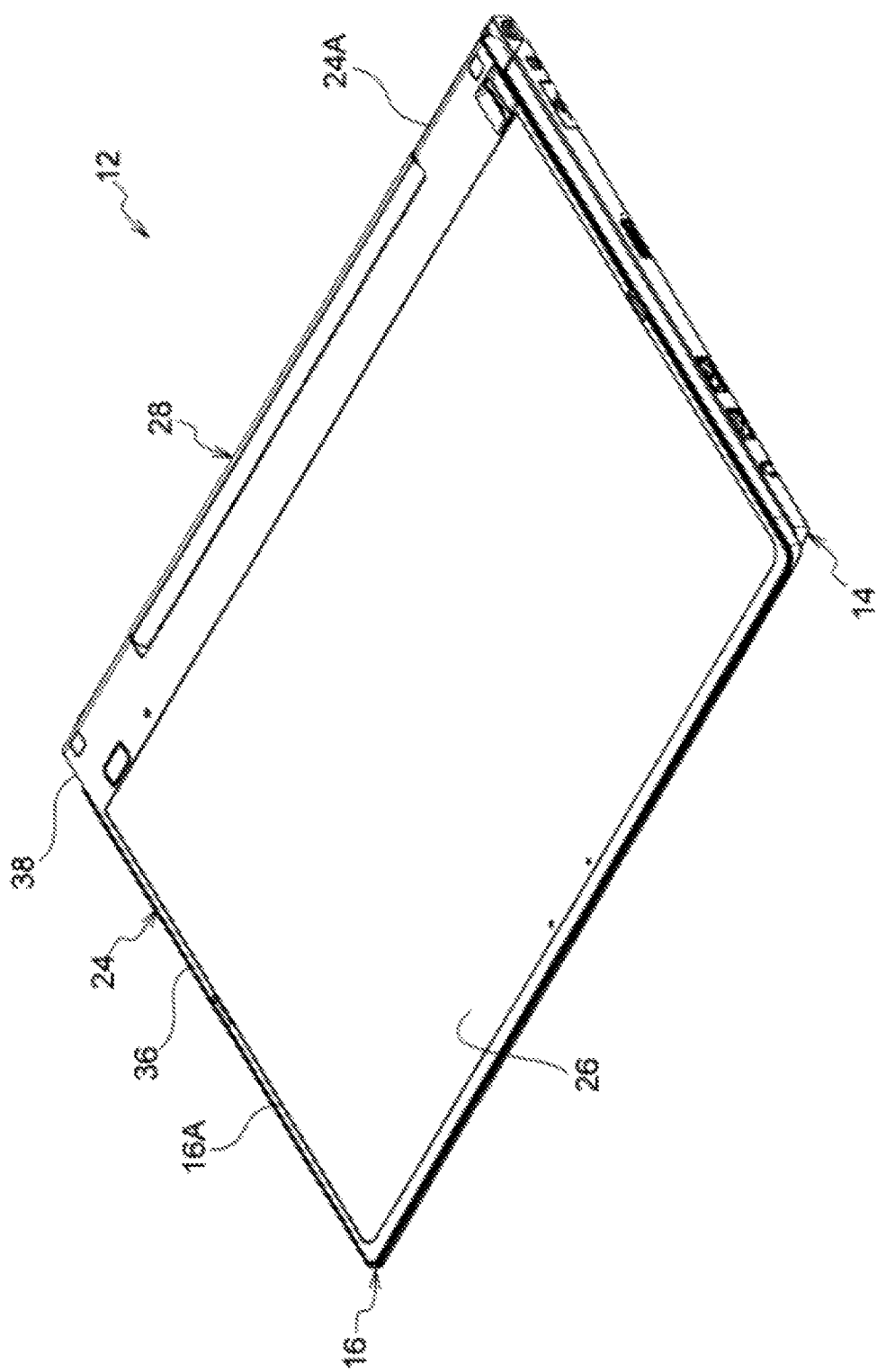
FIG. 3 is a perspective view of the electronic device of the first embodiment.

FIGS. 1 to 3 illustrate an electronic device 12 of the first embodiment. The electronic device 12 has an electronic-device main body 14 and a display device 16. The electronic-device main body 14 of this embodiment includes, inside a casing 18, a substrate including a processor, a main storage device, and the like, an auxiliary storage device, an input device (for example, a keyboard 20, a pointing pad 22, and the like), a cooling device, various interfaces, and the like.

As illustrated in FIG. 2, the display device 16 includes a display 26 inside a casing 24 (a back cover 36 to be described later). The display 26 displays information based on signals received from the electronic-device main body 14. The display 26 may further be configured to receive input of information from a user of the electronic device 12 and send this input information to the electronic-device main body 14. The electronic-device main body 14 and the display device 16 are rotatably connected to each other by a hinge 28 illustrated in FIG. 4.

The hinge 28 of this embodiment has a seat 29 and a hinge bracket 30. In this embodiment, the seat 29 is fixed to the electronic-device main body 14, while the hinge bracket 30 is fixed to the display device 16. Conversely, the seat 29 may be fixed to the display device 16, while the hinge bracket 30 may be fixed to the electronic-device main body 14.

In this embodiment, the hinge bracket 30 has a first shaft 32A extending along one edge side 24A of the casing 24 (see FIGS. 1 to 3) and a second shaft 32B extending in a direction different from the first shaft 32A (in the example illustrated, a direction orthogonal to the first shaft 32A). The second shaft 32B is rotatably attached to the seat 29. The hinge 28 (the hinge bracket 30) may be structured to include only one of the first shaft 32A and the second shaft 32B.

The hinge 28 is rotatable in a direction indicated by arrow R1 about the first shaft 32A (see a center line X1). By this rotation, the hinge 28 changes its position between a superimposed state illustrated in FIGS. 1 and 3 where the electronic-device main body 14 and the display device 16 are closed and a separated state illustrated in FIG. 2 where the electronic-device main body 14 and the display device 16 are open.

In the separated state described above, the hinge 28 is rotatable relative to the seat 29 about the second shaft 32B (see a center line X2). This rotation allows the display device 16 to rotate relative to the electronic-device main body 14 in a direction indicated by arrow R2, as illustrated in FIG. 2.

In the state illustrated in FIG. 1 in particular, a display surface 16A of the display device 16 on which the display 26 is visible is located on the electronic-device main body 14 side, and a back surface 16B on the opposite side of the display surface 16A is exposed to the outside. In contrast, in the state illustrated in FIG. 3, the back surface 16B is located on the electronic-device main body 14 side, and the display surface 16A is exposed.

The hinge bracket 30 has fixing members 34 formed in the vicinity of both longitudinal ends of the first shaft 32A, respectively. Each fixing member 34 has an arm 34A extending outward from the first shaft 32A radially and a fixing plate 34B formed in a plate shape at a tip of the arm 34A.

The casing 24 of the display device 16 has the back cover 36 and a hinge cover 38. The back cover 36 is an example of a first member, and the hinge cover 38 is an example of a second member. In this embodiment, the back cover 36 and the hinge cover 38 are made of metal (for example, magnesium alloys).

In this embodiment, the back cover 36 and the hinge cover 38 are provided with different coatings from each other. The "different coatings" include different colors and different coating materials. However, the back cover 36 and the hinge cover 38 may also be provided with the same coating.

In this embodiment, an exterior case 40 has the back cover 36, the hinge cover 38, the hinge bracket 30, and fastener screws 64 to be described later.

Figure 6:
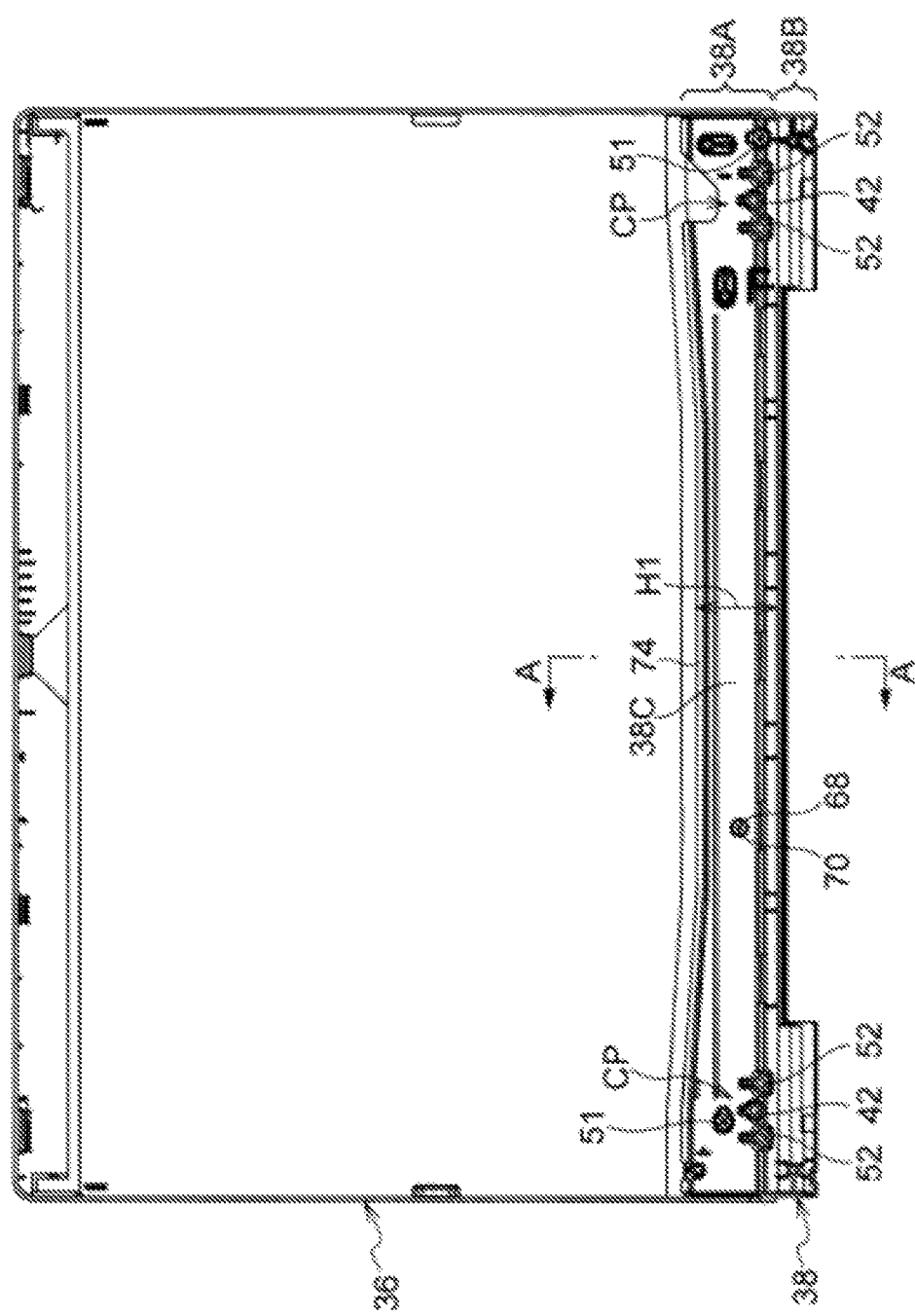
FIG. 6 is a partial plan view of the exterior case of the first embodiment.
Figure 8:
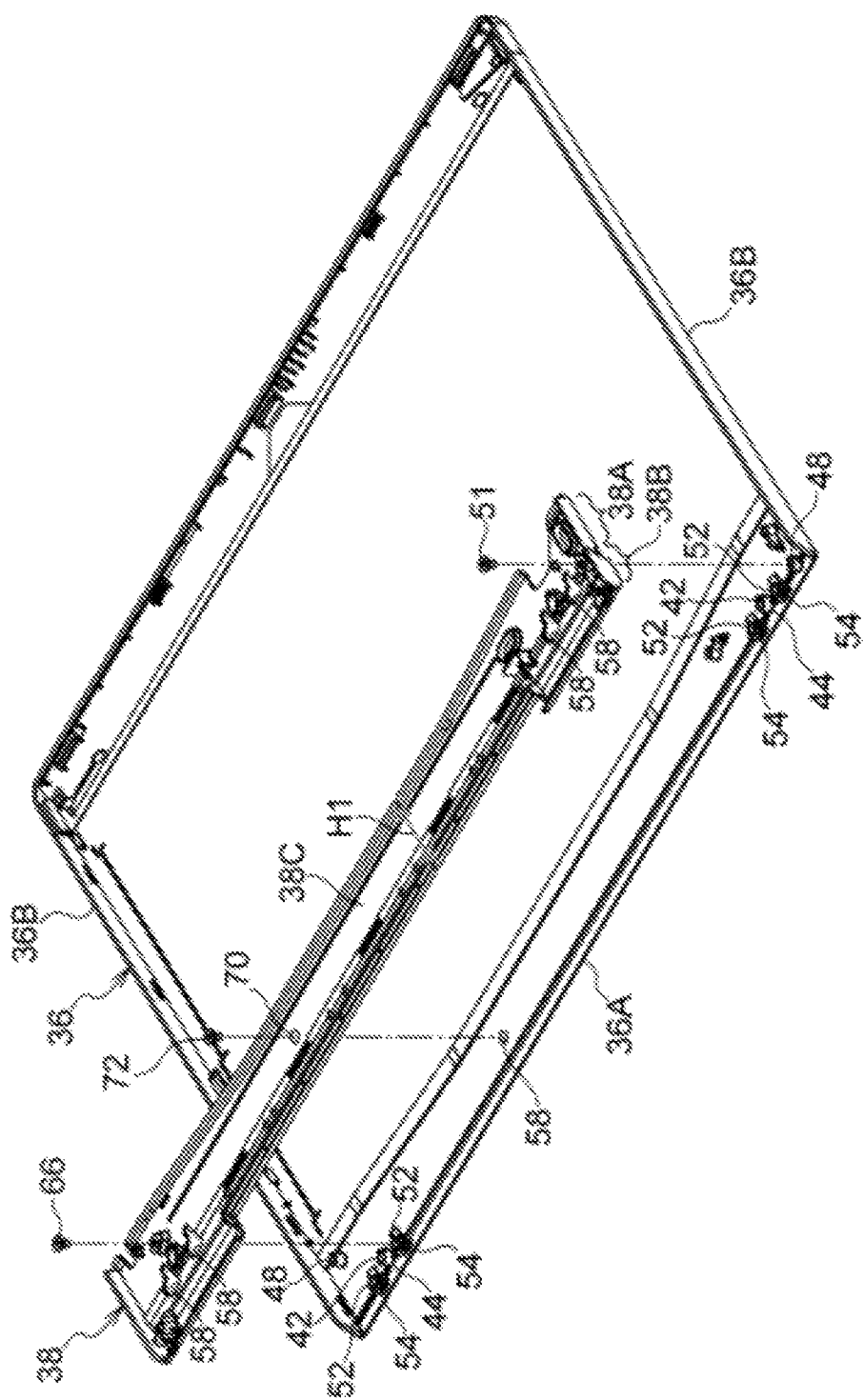
FIG. 8 is an exploded perspective view of the exterior case of the first embodiment.

In this embodiment, the back cover 36 is, as illustrated in FIGS. 6 and 8, formed in a substantially rectangular plate shape, and the hinge cover 38 is, as illustrated in FIG. 8, formed in an elongate plate shape extending along a one edge side 36A of the back cover 36 (a side close to the hinge 28). A longitudinal direction of the hinge cover 38 is the same as an axial direction of the first shaft 32A.

Figure 5:
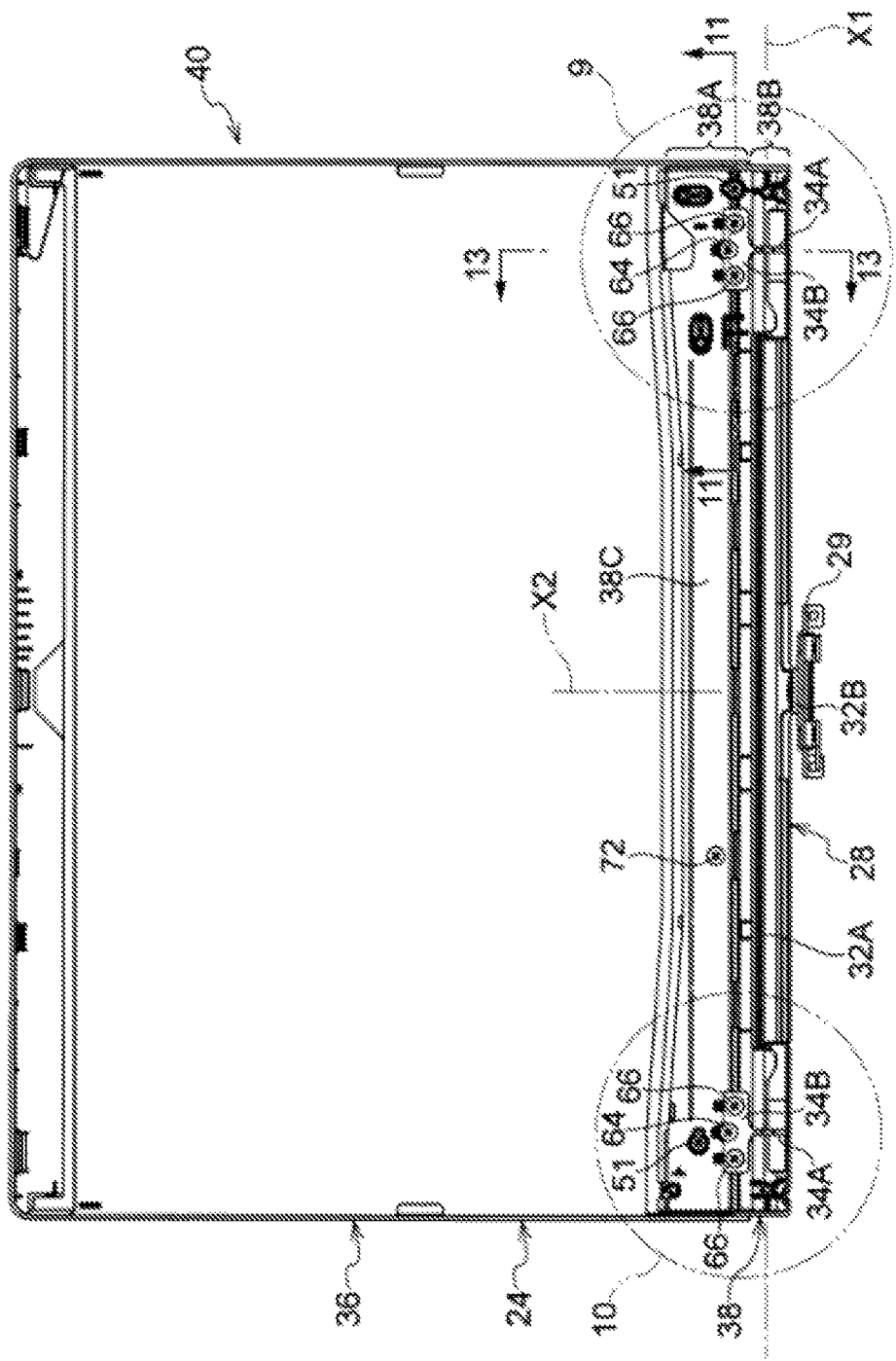
FIG. 5 is a plan view of an exterior case of the first embodiment.
Figure 7:
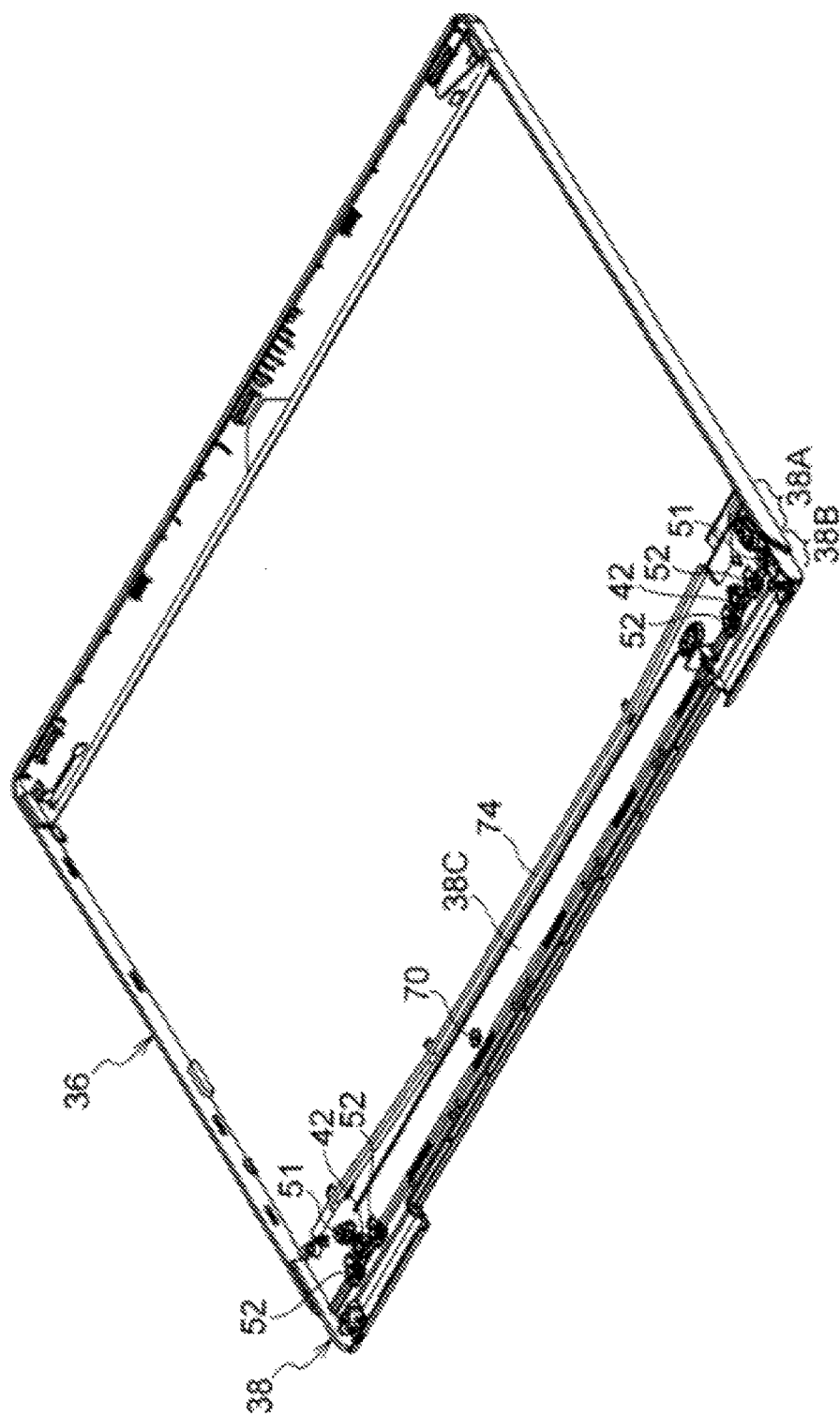
FIG. 7 is a partial perspective view of the exterior case of the first embodiment.

The hinge cover 38 has, as illustrated in FIGS. 5 to 7, an attachment portion 38A superimposed on part of the back cover 36 and a protruding portion 38B protruding from the back cover 36 to the hinge 28 side.

The back cover 36 and the hinge cover 38 are attached to each other at the attachment portion 38A described above by an adhesion 76 (see FIG. 11).

As illustrated in FIG. 8, the back cover 36 has one or more hinge bracket fastener holes 42 formed therein. In this embodiment, there are two hinge bracket fastener holes 42 formed at positions located along the one edge side 36A and away from each other. To be more specific, the two hinge bracket fastener holes 42 are each formed near a corresponding lateral side 36B of the back cover 36 (a side orthogonal to the one edge side 36A).

Figure 11:
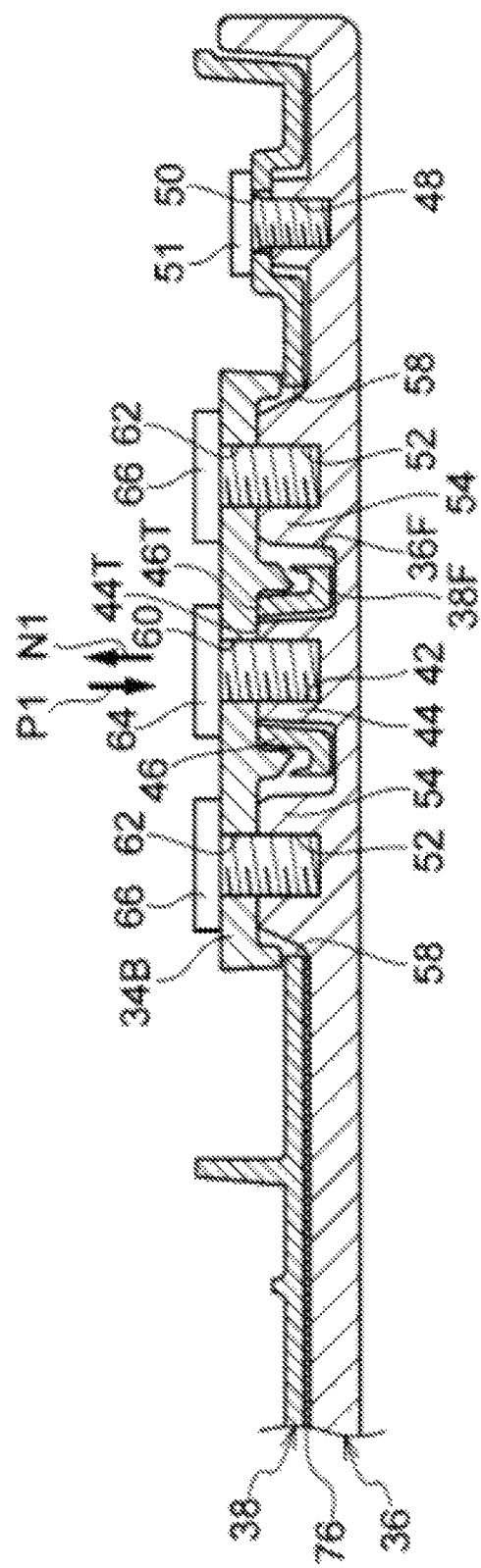
FIG. 11 is a sectional view of the exterior case of the first embodiment, taken along line 11-11 in FIG. 5.
Figure 12:
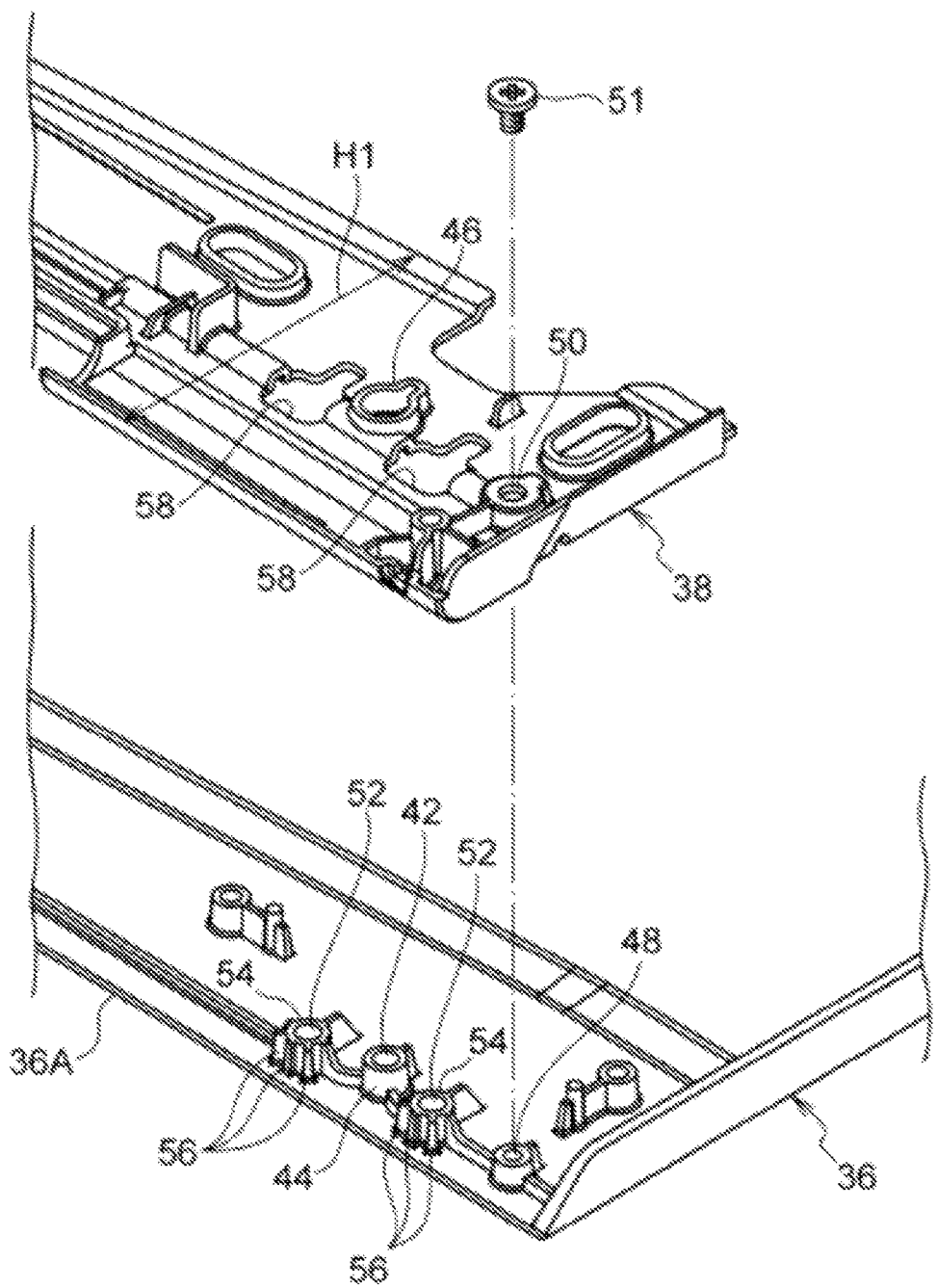
FIG. 12 is a perspective view illustrating part of the exterior case of the first embodiment in an enlarged scale.

As illustrated in FIGS. 11 and 12, around the hinge bracket fastener holes 42, the back cover 36 is partially thickened. Specifically, the back cover 36 rises in a cylindrical shape around each of the hinge bracket fastener holes 42 to form a hinge bracket fastener portion 44.

The hinge cover 38 has thick portions 46 formed therein. Each thick portion 46 is formed in a substantial cylindrical shape to surround the corresponding hinge bracket fastener portion 44 in a plan view. In this embodiment, in particular, an outer circumferential surface of the hinge bracket fastener portion 44 and an inner circumferential surface of the thick portion 46 face each other with a slight space therebetween.

As may be seen in FIG. 11, around the hinge bracket fastener portion 44, the back cover 36 and the hinge cover 38 are in contact with each other at their respective facing surfaces 36F and 38F. More specifically, the facing surface 36F (of the back cover 36) is in contact with the facing surface 38F (of the hinge cover 38) in a direction in which the fastener screw 64 is pulled out from the hinge bracket fastener hole 42 (a direction indicated by arrow N1).

Moreover, a tip 44T of the hinge bracket fastener portion 44 and a tip 46T of the thick portion 46 are flush with each other.

The back cover 36 has formed therein first fixing holes 48 each at a position closer to the corresponding lateral side 36B than the hinge bracket fastener hole 42 is, that is, an outer position along the first shaft 32A. Meanwhile, the hinge cover 38 has first insertion holes 50 at the same positions as the first fixing holes 48 in a plan view.

When first fixing screws 51 are inserted into the first insertion holes 50 from the hinge cover 38 side and screwed into the first fixing holes 48, the hinge cover 38 is screw-fastened to the back cover 36. Since the first fixing holes 48 are formed at the outer positions along the first shaft 32A, the first fixing screws 51 are also located outward of the fastener screw 64.

Figure 13:
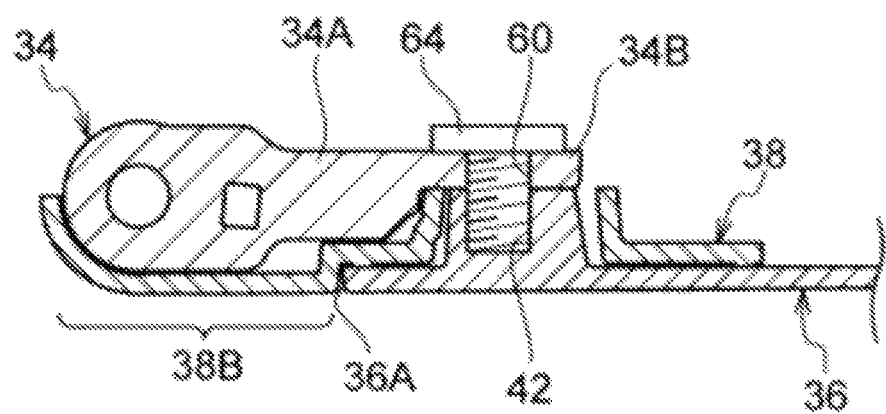
FIG. 13 is a sectional view of the exterior case of the first embodiment, taken along line 13-13 in FIG. 5.

As illustrated in FIG. 13, the back cover 36 has formed therein one or more second fixing holes 52 for each of the hinge bracket fastener holes 42. In this embodiment, the second fixing holes 52 are formed on both sides of each hinge bracket fastener hole 42 along the one edge side 36A, namely one on a side close to the lateral side 36B and one on a side far from the lateral side 36B (four in total in the entire back cover 36).

As illustrated in FIG. 12, around each second fixing hole 52, the back cover 36 is partially thickened to form a boss 54. Ribs 56 are formed around the boss 54 integrally to reinforce the boss 54.

The hinge cover 38 has receiver holes 58 each configured to receive the boss 54 and the ribs 56. The receiver holes 58 receive the bosses 54 and the ribs 56 when the hinge cover 38 is being attached to the back cover 36.

Figure 4:
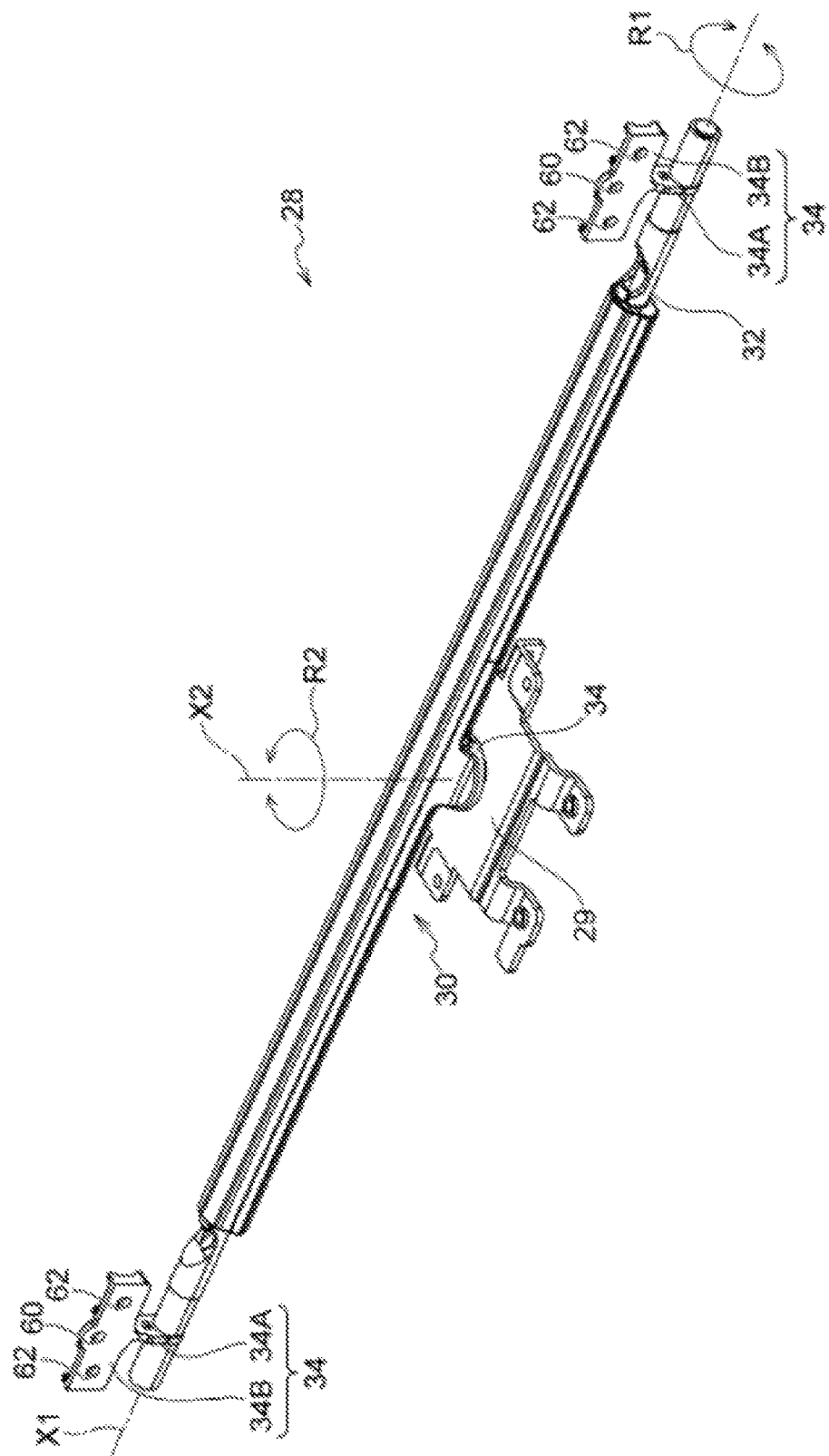
FIG. 4 is a perspective view of a hinge of the first embodiment.

As illustrated in FIG. 4, each fixing plate 34B has a fastener insertion hole 60 formed therein at the same position as the hinge bracket fastener hole 42 in a plan view. The fixing plate 34B also has second insertion holes 62 formed therein at the same positions as the second fixing holes 52.

Figure 9:
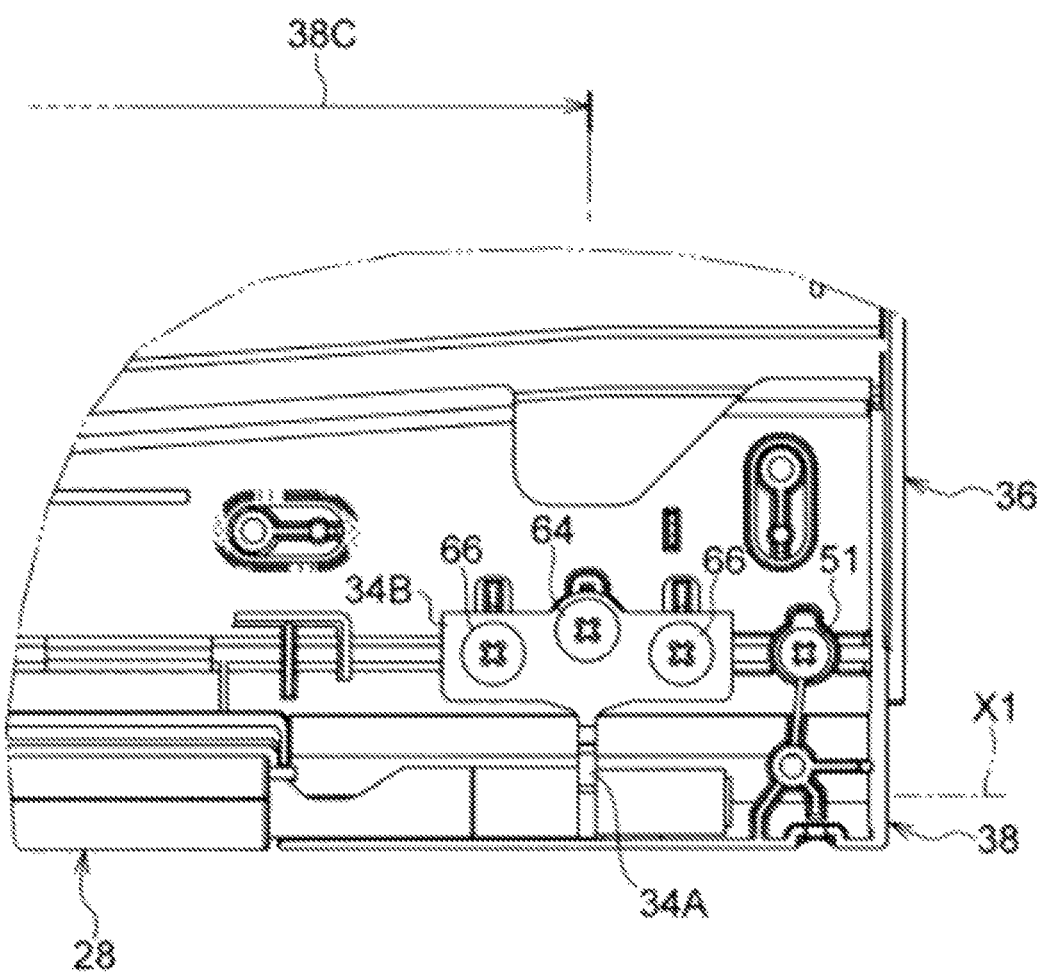
FIG. 9 is a plan view illustrating part of the exterior case of the first embodiment in an enlarged scale, the part indicated by a two-dot chain line 9 in FIG. 5.
Figure 10:
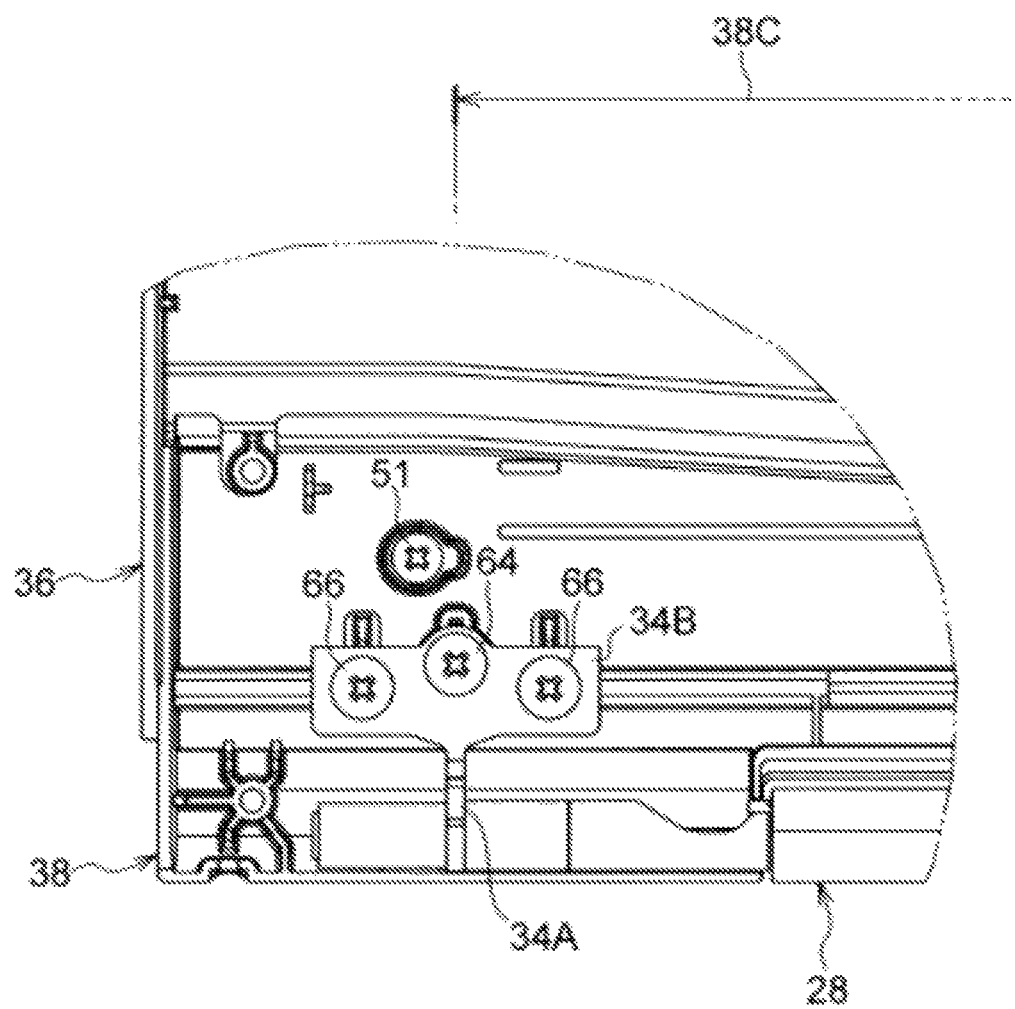
FIG. 10 is a plan view illustrating part of the exterior case of the first embodiment in an enlarged scale, the part indicated by a two-dot chain line 10 in FIG. 5.

As illustrated in FIGS. 9 to 11, when the fastener screws 64 are inserted into the fastening insertion holes 60 from the hinge cover 38 side and screwed into the hinge bracket fastener holes 42, the fixing plates 34B of the hinge bracket 30 are fastened to the back cover 36. Since the thick portions 46 surround the respective hinge bracket fastener holes 42, the screwing-in of the fastener screw 64 causes the back cover 36 and the hinge cover 38 to be fastened together. In this embodiment, portions where the hinge bracket 30 is fastened to the back cover 36 by the fastener screws 64 are an example of a hinge fixing portion.

Further, as may be seen in FIG. 11, the screwing-in of the fastener screws 64 causes each fixing plate 34B to be in tight contact with both of the tip 44T of the hinge bracket fastener portion 44 and the tip 46T of the thick portion 46. The screwing-in of the fastener screws 64 also causes the facing surface 36F of the back cover 36 and the facing surface 38F of the hinge cover 38 to be in strong, tight contact with each other.

Further, when second fixing screws 66 are inserted into the second insertion holes 62 from the hinge cover 38 side and screwed into the second fixing holes 52, the fixing plates 34B of the hinge bracket 30 are fixed to the back cover 36.

Although FIGS. 11 to 13 illustrate an area of one of the hinge bracket fastener holes 42 (the left one in FIGS. 5 and 6), an area of the other one of the hinge bracket fastener holes 42 has a similar structure regarding the points described above.

As illustrated in FIGS. 5 to 10, a portion between the hinge bracket fastener holes 42 (the fastener screws 64) is a longitudinal center position 38C of the hinge cover 38. In this center position 38C, a third fixing hole 68 is formed in the back cover 36. The hinge cover 38 has a third insertion hole 70 formed therein at the same position as the third fixing hole 68 in a plan view. When a third fixing screw 72 is inserted into the third insertion hole 70 and screwed into the third fixing hole 68, the hinge cover 38 may be fixed to the back cover 36 at the longitudinal center position 38C.

The strength of attachment between the back cover 36 and the hinge cover 38 increases gradually from the center position 38C toward each fastener position CP fastened by the fastener screw 64 (see FIG. 6). In the example illustrated in FIG. 6, a height H1 of the hinge cover 38 increases gradually from the center position 38C toward each fastener position CP fastened by the fastener screw 64. Accordingly, the width of attachment between the back cover 36 and the hinge cover 38 increases gradually from the center position 38C toward each fastener position CP, achieving a structure in which the attachment strength gradually increases as well.

Figure 14:
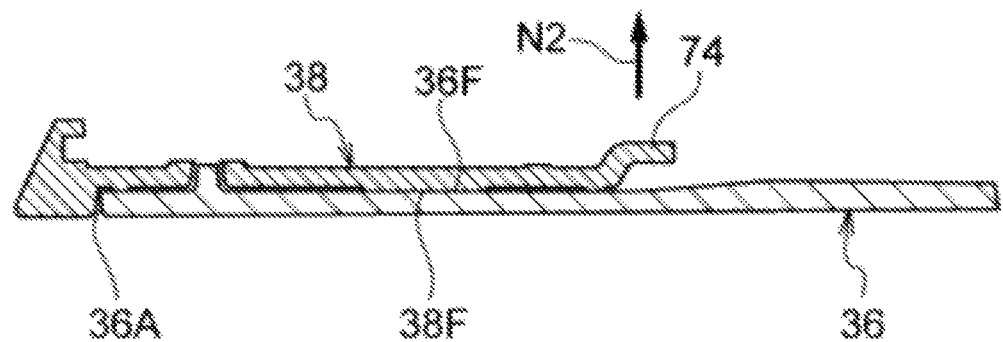
FIG. 14 is a sectional view of the exterior case of the first embodiment, taken along line A-A in FIG. 6.

As illustrated in FIG. 14, the hinge cover 38 has a rib 74 formed therein. The rib 74 is formed by bending part of a plate material forming the hinge cover 38 in a direction away from the back cover 36 (a direction indicated by arrow N2), the part being an upper side 38D of the hinge cover 38 (a side far from the hinge bracket 30). The hinge cover 38 is reinforced by the rib 74, and is improved, for example, in the rigidity in the longitudinal direction.

The facing surface 38F of the hinge cover 38 which is on the opposite side of the bending direction of the rib 74 (the direction indicated by arrow N2) faces the facing surface 36F of the back cover 36.

Thus, for example, even if a recess is locally formed in the facing surface 38F of the hinge cover 38 during shaping of the rib 74, the recess is not visible because the facing surface 38F is covered by the hinge cover 38. Since there is no worry about occurrence of a recess during the formation of the rib 74, the shape or size of the rib 74 is less constrained, allowing an effective improvement in the strength of the hinge cover 38.

Next, operation according to this embodiment is described.

In the electronic device 12 of this embodiment, the hinge bracket 30 has the first shaft 32A and the second shaft 32B. The first shaft 32A enables the display device 16 to rotate relative to the electronic-device main body 14 in the direction indicated by arrow R1, and the second shaft 32B enables the display device 16 to rotate in the direction indicated by arrow R2.

The casing 24 of the display device 16 has the back cover 36 and the hinge cover 38. In addition, the hinge cover 38 is fixed to the back cover 36 by adhesion and screwing-in of the first fixing screws 51 and the third fixing screw 72. The portion where the back cover 36 and the hinge cover 38 are thus superimposed and fixed to each other is thick overall as the casing 24 and therefore has a high strength. In particular, a portion desired to have a high strength as the casing 18 is appropriately increased in strength by the superimposition of the hinge cover 38 and the back cover 36, while excessive reinforcement may be suppressed at a portion not desired to have a high strength. This possibly contributes to thickness reduction, weight reduction, and cost reduction of the display device 16. Since the casing 24 has two components (covers), namely the back cover 36 and the hinge cover 38, different coatings (selective coating) may be employed for these covers.

FIG. 15 depicts materials and structures employable for the casing 24 of the display device 16 of this embodiment and comparative examples, as well as evaluations in terms of the following viewpoints: thickness, weight, strength, selective coating, and cost. As ranks of the evaluations, "A" indicates that the result is particularly good. "B" indicates that the result is inferior to that ranked "A" in that viewpoint. "C" indicates that the result is inferior to that ranked "B" in that viewpoint. Note that the evaluation ranks as "B" and "C" are merely relative evaluation ranks for each viewpoint, and do not indicate that those ranked as such have practical problems.

In FIG. 15, "RESIN" in Comparative Example 1 indicates that the casing of the display device has two components both made of resin. Being made of resin, Comparative Example 1 has an advantage in terms of cost over a structure using metal to be described later. Moreover, it is easy to perform selective coating on part of the casing. However, Comparative Example 1 employs a structure with increased thickness to improve strength, and is therefore disadvantageous in terms of thickness reduction and weight reduction. In other words, it is hard with Comparative Example 1 to achieve both thickness reduction and weight reduction.

"INTEGRATED METAL" of Comparative Example 2 indicates that the casing is formed integrally by way of casting, injection molding, or the like using metal such as a magnesium alloy. Comparative Example 2 may have more strength than Comparative Example 1, and achieve thickness reduction and weight reduction, as well. However, since Comparative Example 2 is an integrated member made of metal, it is hard to provide selective coating.

"METAL+RESIN" of Comparative Example 3 indicates that the casing has a combined structure of metal and resin. For example, in the combined structure, a portion corresponding to the back cover in the above embodiment is made of metal, while a portion corresponding to the hinge cover is made of resin. Being made of resin in part, Comparative Example 3 may be uneven in strength locally, and is therefore disadvantageous in terms of strength.

"SHAVED METAL" of Comparative Example 4 indicates that the casing is made of metal such as an aluminum alloy and formed by shaving. Being formed by shaving metal, Comparative Example 4 is disadvantageous in terms of cost. Moreover, since the casing is integrally formed with metal, it is hard to provide selective coating.

In contrast to these comparative examples, this embodiment has a structure in which, as described above, the casing 18 has two components, namely the back cover 36 and the hinge cover 38, and therefore may achieve thickness reduction and weight reduction, while offering desired strength. Moreover, since there are two components, namely the back cover 36 and the hinge cover 38, it is possible to provide selective coating to them. The back cover 36 and the hinge cover 38 being made of metal and possibly formed by casting, injection molding, or the like may contribute to cost reduction, as well.

The overall electronic device 12 may achieve thickness reduction and weight reduction while offering desired strength. In addition, the electronic device 12 may have a structure in which the back cover 36 and the hinge cover 38 are provided with different coatings from each other.

In this embodiment, the thick portions 46 of the hinge cover 38 surround the respective hinge bracket fastener portions 44 of the back cover 36 in a plan view. Then, with the fastener screws 64 screwed into the hinge bracket fastener holes 42, each fixing plate 34B of the hinge bracket 30 is in contact with both the tip 44T of the hinge bracket fastener portion 44 and the tip 46T of the thick portion 46. Hence, force exerted from the hinge bracket 30 via the fixing plate 34B is dispersed to both of the hinge bracket fastener portion 44 and the thick portion 46, that is, the back cover 36 and the hinge cover 38. In comparison to a structure in which the force from the hinge bracket 30 is exerted only on one of the back cover 36 and the hinge cover 38, the structure of this embodiment possibly suppresses deformation and fracture of the back cover 36 and the hinge cover 38.

In this embodiment, as may be seen in FIG. 2, the display device 16 has a structure rotatable about the second shaft 32B in the direction indicated by arrow R2. This rotation may cause, as illustrated in FIG. 11, a force of a direction in which the fastener screw 64 is pressed into the hinge bracket fastener hole 42 (a direction indicated by arrow P1) and a force of a direction in which the fastener screw 64 is pulled out from the hinge bracket fastener hole 42 (the direction indicated by arrow N1).

In this embodiment, each fixing plate 34B is in contact with both the tip 44T of the hinge bracket fastener portion 44 and the tip 46T of the thick portion 46. Accordingly, the force in the direction in which the fastener screw 64 is pressed is dispersed to both of the back cover 36 and the hinge cover 38 via the fixing plate 34B. Since the force is thus dispersed, deformation and fracture of the back cover 36 and the hinge cover 38 are possibly suppressed.

Further, in this embodiment, the back cover 36 and the hinge cover 38 are in surface contact with each other at their facing surfaces 36F and 38F, the back cover 36 being in contact with the hinge cover 38 in the direction in which the fastener screws 64 are pulled out from the hinge bracket fastener holes 42 (the direction indicated by arrow N1). Thus, the force in the direction in which the fastener screws 64 are pulled out from the hinge bracket fastener holes 42 is exerted from the back cover 36 to the hinge cover 38 via the facing surfaces 36F and 38F. In other words, the force of the pulling direction exerted on the fastener screws 64 is received by both of the back cover 36 and the hinge cover 38, and therefore deformation and fracture of the back cover 36 and the hinge cover 38 are possibly suppressed.

In this embodiment, the hinge cover 38 is provided with the thick portions 46. Then, since the tip 46T of each thick portion 46 is flush with the tip 44T of the corresponding hinge bracket fastener portion 44, a structure is achieved in which each fixing plate 34B is in contact with both of the tip 44T of the hinge bracket fastener portion 44 and the hinge cover 38. However, the structure in which each fixing plate 34B is in contact with both of the tip 44T of the hinge bracket fastener portion 44 and the hinge cover 38 may be achieved even if the thick portions 46 are not provided. For example, the structure in which the tip 44T of the hinge bracket fastener portion 44 is flush with the hinge cover 38 may be achieved by adjusting a degree of protrusion of the hinge bracket fastener portion 44. When the hinge cover 38 has the thick portions 46 formed therein as in the embodiment described above, the thick portions 46 surround and thereby reinforce the respective hinge bracket fastener portions 44. Thus, deformation of the hinge bracket fastener portions 44 is possibly suppressed.

In this embodiment, the first fixing screws 51 fix the back cover 36 and the hinge cover 38 to each other. Such structure allows the back cover 36 and the hinge cover 38 to be integrated with each other more strongly than a structure in which the back cover 36 and the hinge cover 38 are fixed to each other only by an adhesion.

Each first fixing screw 51 fixes the back cover 36 and the hinge cover 38 to each other at a position outward of the hinge bracket fastener hole 42 along the first shaft 32A, that is, a position close to the lateral side 36B. In other words, the first fixing screw 51 fixes the back cover 36 and the hinge cover 38 to each other at a longitudinal end portion at which separation of the hinge cover 38 from the back cover 36 might start (the position close to the lateral side 36B). Accordingly, separation of the back cover 36 from the hinge cover 38 is possibly suppressed.

In this embodiment, the second fixing screws 66 fix the back cover 36 and the hinge bracket 30 to each other. Such structure allows the hinge bracket 30 to be fixed to the back cover 36 more strongly than a structure in which the back cover 36 and the hinge bracket 30 are fixed to each other only by the fastener screws 64.

Moreover, in this embodiment, more than one (two in the example in FIGS. 9 and 10) second fixing screws 66 are provided per fastener screw 64, one on the outer side and one on the inner side of the fastener screw 64 along the first shaft 32A. Thus, the hinge bracket 30 may be fixed to the back cover 36 strongly, compared to a structure in which only one second fixing screw 66 is provided for one fastener screw 64.

In addition, the second fixing screws 66 directly fix the back cover 36 and the hinge bracket 30 to each other. Thus, for example, a force exerted from the back cover 36 to the hinge cover 38 when the display device 16 is rotated about the first shaft 32A does not go through the second fixing screws 66. This allows the back cover 36 and the hinge cover 38 to maintain to be fixed to each other with a high strength.

In this embodiment, more than one (two in the example in FIG. 5) fastener screw 64 is provided in the axial direction of the first shaft 32A, that is, the longitudinal direction of the hinge cover 38. Thus, the hinge bracket 30 may be fixed to the back cover 36 strongly, compared to a structure provided with only one fastener screw 64.

Further, the back cover 36 and the hinge cover 38 are fixed to each other by the third fixing screw 72 at the longitudinal center position 38C of the hinge cover 38, which is between the fastener screws 64 located at the both axial ends of the first shaft 32A. Thus, in comparison to a structure provided with no third fixing screw 72, separation of an attachment portion at the longitudinal center position 38C of the hinge cover 38 is possibly suppressed, and also, the back cover 36 and the hinge cover 38 may be fixed to each other strongly, improving the strength of the casing 24. Moreover, for example, an overall positional misalignment between the back cover 36 and the hinge cover 38 is possibly suppressed.

The strength of attachment between the back cover 36 and the hinge cover 38 increases gradually from the center position 38C toward each fastener position CP fastened by the fastener screw 64. Hence, even if the hinge cover 38 separates from the back cover 36 at the center position 38C, spread of the separation portion toward the fastener position CP is possibly suppressed.

In the above embodiment, the fastener position at which the fastener screw 64 fastens the hinge bracket 30 to the casing 18 is set at both sides of the one edge side 36A of the back cover 36. Alternatively, for example, the fastener position may be set at a position near the center of one side of the casing 24. In this case, the strength of fixing the hinge bracket 30 to the back cover 36 and the strength of fixing the back cover 36 and the hinge cover 38 to each other may be increased by appropriately selecting the number, positions, and the like of the first fixing screws 51 and the third fixing screw 72.

Examples of the electronic device 12 include a laptop computer, but the electronic device 12 is not limited thereto. As an example, the electronic device 12 may be a device in which the electronic-device main body 14 reads video data and/or image data recorded in a recording medium which is set in the electronic-device main body 14, and the display device 16 displays the data.

Although the embodiment of a technique disclosed in the preset application has been described, the technique disclosed in the present application is not limited to the above, and may of course be carried out not only in the mode described above, but also in various modified modes which do not depart from the gist thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A housing, comprising:
   a first member that includes a plurality of prongs, each of the plurality of prongs having a hole and projecting in a thickness direction of the first member from a surface of the first member;
   a second member with a plurality of openings, each of the plurality of prongs being inserted into each of the plurality of openings, a width of attachment of the second member being tapered from a position of each of the plurality of openings toward a center position between positions of the plurality of openings, the width of attachment being a size of a vertical direction of a line linking the plurality of openings; and
   a plurality of fastener screws, each of the plurality of fastener screws being screwed into an opening of each of a plurality of hinge brackets and the hole of each of the plurality of prongs to fasten the first member and the second member and the hinge bracket, the second member being located between the hinge bracket and the first member, a head of each of the plurality of fastener screws pressing each of the plurality of hinge brackets and further each of the plurality of pressed hinge brackets pressing both of the top of each of the plurality of prongs and the surface of the second member.

2. The housing according to claim 1, wherein
   a diameter of the head of the screw is larger than the opening of the second member.

3. The housing according to claim 1, wherein
   the first member is in contact with the second member in a direction in which the fastener screw is pulled out from the hole.

4. The housing according to claim 1, wherein
   a portion of the second member is thickened to form a thick portion rising to surround the prong.

5. The housing according to claim 1, further comprising
   a first fixing screw that fixes the first member and the second member to each other.

6. The housing according to claim 5, wherein
   the hinge bracket includes a first shaft extending along one side of the first member, and
   the first fixing screw fixes the first member and the second member to each other at a position outward of the fastener screw in an axial direction of the first shaft.

7. The housing according to claim 6, further comprising
   at least one second fixing screw that fixes the first member and the hinge bracket to each other.

8. The housing according to claim 7, wherein
   a plurality of the second fixing screws are provided for the fastener screw, and arranged at positions outward and inward of the fastener screw in the axial direction of the first shaft.

9. The housing according to claim 6, wherein
   a plurality of the fastener screws are provided along the axial direction of the first shaft, and
   the housing further comprises a third fixing screw which fixes the first member and the second member to each other at a position between the fastener screws located at both axial ends of the first shaft.

10. The housing according to claim 9, wherein
    the plurality of the fastener screws are provided along the axial direction of the first shaft.

11. The housing according to claim 1, wherein
    the hinge bracket includes
    a first shaft extending in a direction along one side of the first member, and
    a second shaft extending in a direction different from the first shaft.

12. The housing according to claim 1, wherein
    the first member and the second member are made of metal.

13. The housing according to claim 1, wherein
    the first member and the second member are provided with coatings different from each other.

14. An electronic device, comprising:
    a housing including
    a first member that includes a plurality of prongs, each of the plurality of prongs having a hole and projecting in a thickness direction of the first member from a surface of the first member,
    a second member with a plurality of openings, each of the plurality of prongs being inserted into each of the plurality of openings,
    a width of attachment of the second member being tapered from a position of each of the plurality of openings toward a center position between positions of the plurality of openings, the width of attachment being a size of a vertical direction of a line linking the plurality of openings, and
    a plurality of fastener screws, each of the plurality of fastener screws being screwed into an opening of each of a plurality of hinge brackets and the hole of each of the plurality of prongs to fasten the first member and the second member and the hinge bracket, the second member being located between the hinge bracket and the first member, a head of each of the plurality of fastener screws pressing each of the plurality of hinge brackets and further each of the plurality of pressed hinge brackets pressing both of the top of each of the plurality of prongs and the surface of the second member, a hinge which has the hinge bracket, and a body rotatably attached to the housing by the hinge.

15. The housing according to claim 9, wherein each of tops of the plurality of prongs and a surface of the second member is flush.

\* \* \* \* \*